US012608021B2

(12) United States Patent
Iwahori et al.

(10) Patent No.: US 12,608,021 B2
(45) Date of Patent: Apr. 21, 2026

(54) CONTROL DEVICE, PRODUCTION MANAGEMENT DEVICE, AND CONTROL METHOD

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 18/767,117

(22) Filed: Jul. 9, 2024

(65) Prior Publication Data

US 2025/0138550 A1    May 1, 2025

(30) Foreign Application Priority Data

Oct. 31, 2023    (JP) ................................. 2023-186500

(51) Int. Cl.
G05D 1/06      (2006.01)
G05D 1/644     (2024.01)
G05D 107/13    (2024.01)

(52) U.S. Cl.
CPC ......... G05D 1/644 (2024.01); G05D 2107/13 (2024.01)

(58) Field of Classification Search
CPC ........................... G05D 1/644; G05D 2107/13
USPC ........................................................... 701/23
See application file for complete search history.

(56) References Cited

U.S. PATENT DOCUMENTS

| | | | | |
|---|---|---|---|---|
| 2006/0074778 A1* | 4/2006 | Katou | .................. | G06Q 10/083 |
| | | | | 705/28 |
| 2017/0320529 A1 | 11/2017 | Nordbruch | | |
| 2022/0373341 A1* | 11/2022 | Pankov | .................... | G05D 1/65 |
| 2023/0305554 A1* | 9/2023 | Heo | ...................... | G05D 1/0061 |
| 2024/0160226 A1* | 5/2024 | Bell | ........................ | G05D 1/644 |
| 2024/0320623 A1* | 9/2024 | Shekhar | ............. | G06Q 30/0201 |

FOREIGN PATENT DOCUMENTS

JP            2017-538619 A        12/2017

* cited by examiner

*Primary Examiner* — Mahmoud S Ismail
(74) *Attorney, Agent, or Firm* — SoraIP, Inc.

(57)            ABSTRACT

A control device includes an acquisition unit that acquires a traveling environment in which a movable body that can travel by unmanned driving travels, and a control unit that controls the movable body so as to lengthen or shorten a traveling time in the traveling environment in accordance with a degree of an influence of the traveling environment acquired by the acquisition unit on the quality of the movable body.

3 Claims, 7 Drawing Sheets

FIG. 3

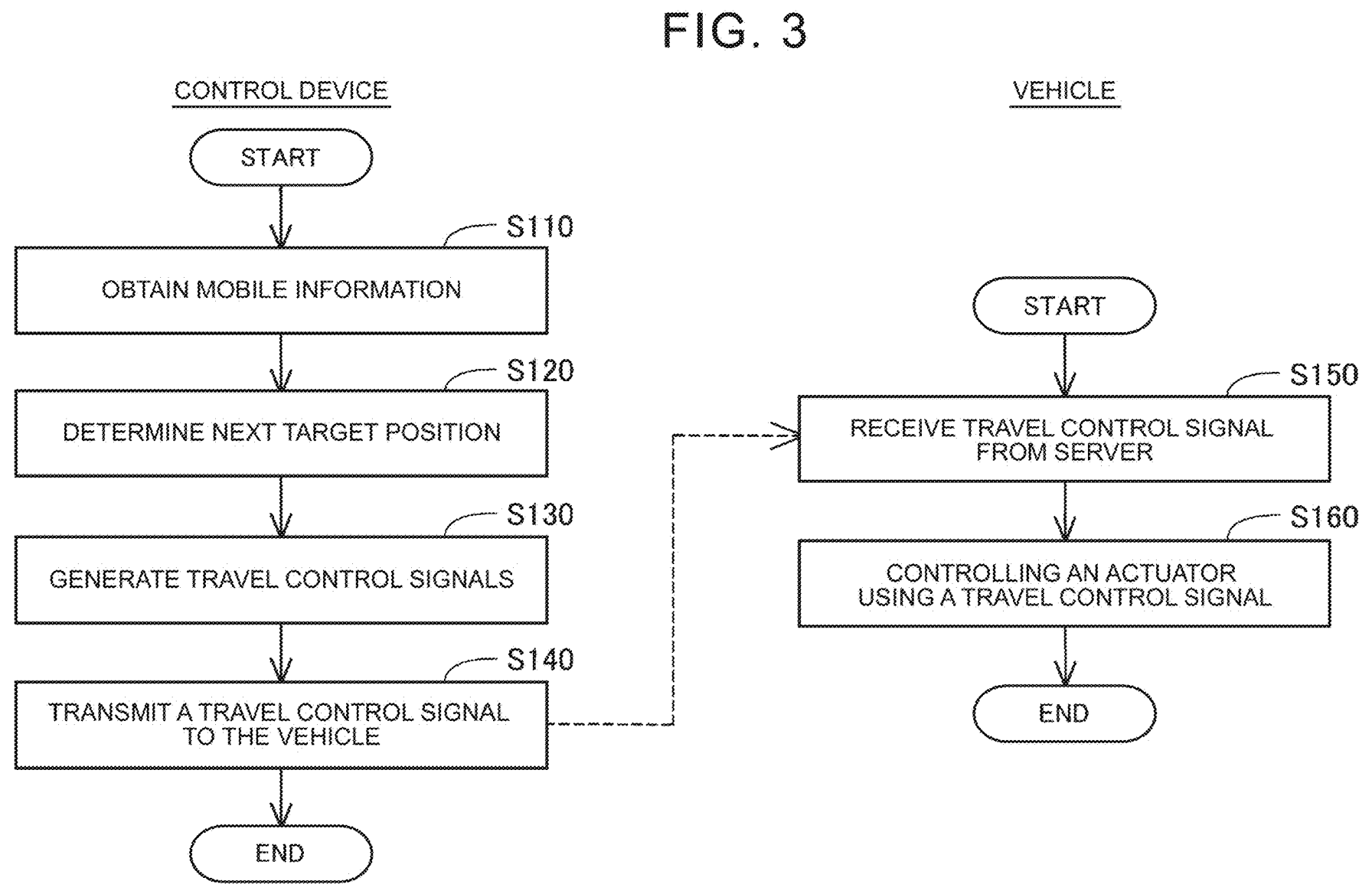

VEHICLE

START

RECEIVE TRAVEL CONTROL SIGNAL
FROM SERVER — S150

CONTROLLING AN ACTUATOR
USING A TRAVEL CONTROL SIGNAL — S160

END

CONTROL DEVICE

START

OBTAIN MOBILE INFORMATION — S110

DETERMINE NEXT TARGET POSITION — S120

GENERATE TRAVEL CONTROL SIGNALS — S130

TRANSMIT A TRAVEL CONTROL SIGNAL
TO THE VEHICLE — S140

END

PRODUCTION MANAGEMENT DEVICE

CONTROL DEVICE, PRODUCTION MANAGEMENT DEVICE, AND CONTROL METHOD

CROSS-REFERENCE TO RELATED APPLICATION

This application claims priority to Japanese Patent Application No. 2023-186500 filed on Oct. 31, 2023, incorporated herein by reference in its entirety.

BACKGROUND

1. Technical Field

The present disclosure relates to a control device, a production management device, and a control method.

2. Description of Related Art

For example, Japanese Unexamined Patent Application Publication (Translation of PCT Application) No. 2017-538619 (JP 2017-538619 A) discloses a technology for causing a vehicle to travel by remote control in a vehicle manufacturing process.

SUMMARY

In a manufacturing process for a moving body such as a vehicle, there has been a demand not to expose the moving body to rain and wind.

The present disclosure can be realized in the following aspects.

(1) According to a first aspect of the present disclosure, a control device is provided. The control device includes:

an acquisition unit configured to acquire a traveling environment for a moving body configured to travel by unattended driving; and a control unit configured to control the moving body to increase or reduce a traveling period in the traveling environment acquired by the acquisition unit based on a degree of influence of the traveling environment on quality of the moving body.

With the control device of this aspect, the length of the traveling period of the moving body in the traveling environment can be changed depending on the traveling environment. For example, the traveling period of the moving body in the rain can be reduced.

(2) In the control device of the above aspect, the traveling environment may be an outdoor environment, and the control unit may be configured to control at least one of a stop period of the moving body, a moving speed of the moving body in the traveling environment, and a moving route of the moving body to reduce the traveling period in the traveling environment as the degree increases.

With the control device of this aspect, the traveling period in the outdoor environment can be reduced by controlling at least one of the stop period, the moving speed, and the moving route of the moving body.

(3) In the control device of the above aspect, the degree of influence of the traveling environment including at least one of precipitation, fog, mist, and lightning on the quality may be higher than the degree of influence of the traveling environment including none of the precipitation, the fog, the mist, and the lightning on the quality, and the control unit may be configured to control the moving body to reduce the traveling period in the traveling environment including at least one of the precipitation, the fog, the mist, and the lightning.

With the control device of this aspect, it is possible to reduce the traveling period in the traveling environment including at least one of the precipitation, the fog, the mist, and the lightning.

(4) According to a second aspect of the present disclosure, a production management device is provided. The production management device includes:

an acquisition unit configured to acquire a traveling environment for a moving body configured to travel by unattended driving; and a management unit configured to adjust the number of the moving bodies to be produced based on a degree of influence of the traveling environment on quality of the moving body. With the production management device of this aspect, the number of the moving bodies to be produced can be adjusted depending on the traveling environment. Therefore, it is possible to reduce or increase the traveling period of the moving body in a traveling environment in which the degree of influence on the quality of the moving body is higher than a predetermined degree. For example, the traveling period of the moving body in the rain can be reduced.

The present disclosure can be implemented in various forms, and can be implemented, for example, in the form of a vehicle, a vehicle control system, control methods therefor, a computer program, or a recording medium on which the computer program is recorded.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating a processing procedure of travel control of a vehicle;

DETAILED DESCRIPTION OF EMBODIMENTS

A. First Embodiment

Figure 1:
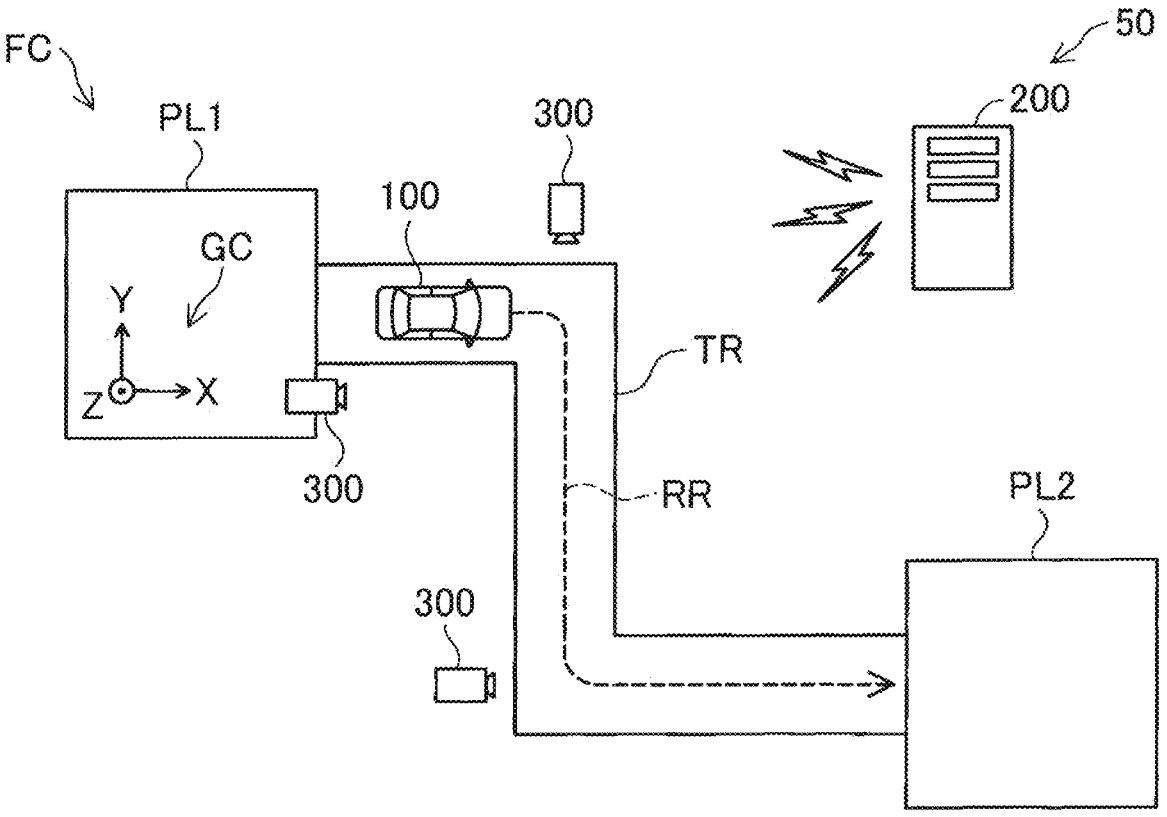
FIG. 1 is a conceptual diagram illustrating a configuration of a system.

FIG. 1 is a conceptual diagram illustrating a configuration of a system 50 according to a first embodiment. The system 50 includes one or more vehicles 100 as a moving object, a control device 200, and one or more external sensors 300.

In the present disclosure, "moving object" means a movable object, and is, for example, a vehicle or an electric vertical takeoff and landing machine (a so-called flying vehicle). The vehicle may be a vehicle traveling by a wheel or a vehicle traveling by an infinite track, and is, for example, a passenger car, a truck, a bus, a two-wheeled vehicle, a four-wheeled vehicle, a tank, a construction vehicle, or the like. Vehicles include battery electric vehicle (BEV), gasoline-powered vehicles, hybrid electric vehicle, and fuel cell electric vehicle. When the moving body is other than the vehicle, the expressions of "vehicle" and "vehicle" in the present disclosure can be appropriately replaced with "moving body", and the expression of "traveling" can be appropriately replaced with "moving".

The vehicle 100 is configured to be able to travel by unmanned driving. The term "unmanned driving" means driving that does not depend on the traveling operation of the passenger. The traveling operation means an operation related to at least one of "running", "turning", and "stopping" of the vehicle 100. The unmanned driving is realized by automatic or manual remote control using a device located outside the vehicle 100 or by autonomous control of the vehicle 100. A passenger who does not perform the traveling operation may be on the vehicle 100 traveling by the unmanned driving. The passenger who does not perform the traveling operation includes, for example, a person who is simply seated on the seat of the vehicle 100 and a person who performs a work different from the traveling operation such as an assembling operation, an inspection operation, and an operation of switches while riding on the vehicle 100. Driving by the traveling operation of the occupant is sometimes referred to as "manned driving".

Herein, "remote control" includes "full remote control" in which all of the operations of the vehicle 100 are completely determined from the outside of the vehicle 100, and "partial remote control" in which a part of the operations of the vehicle 100 is determined from the outside of the vehicle 100. Also, "autonomous control" includes "fully autonomous control" in which the vehicle 100 autonomously controls its operation without receiving any information from a device external to the vehicle 100. "Autonomous control" includes "partial autonomous control" in which the vehicle 100 autonomously controls its operation using information received from a device external to the vehicle 100.

In the present embodiment, the system 50 is used in a factory FC that manufactures the vehicles 100. The reference coordinate system of the factory FC is a global coordinate system GC. That is, any position in the factory FC is represented by the coordinates of X, Y, Z in the global coordinate system GC. The factory FC includes a first location PL1 and a second location PL2. The first location PL1 and the second location PL2 are connected by a track TR on which the vehicles 100 can travel. In the factory FC, a plurality of external sensors 300 is installed along the track TR. The positions of the external sensors 300 in the factory FC are adjusted in advance. The vehicles 100 travel through the track TR from the first location PL1 to the second location PL2 by unmanned driving.

Figure 2:
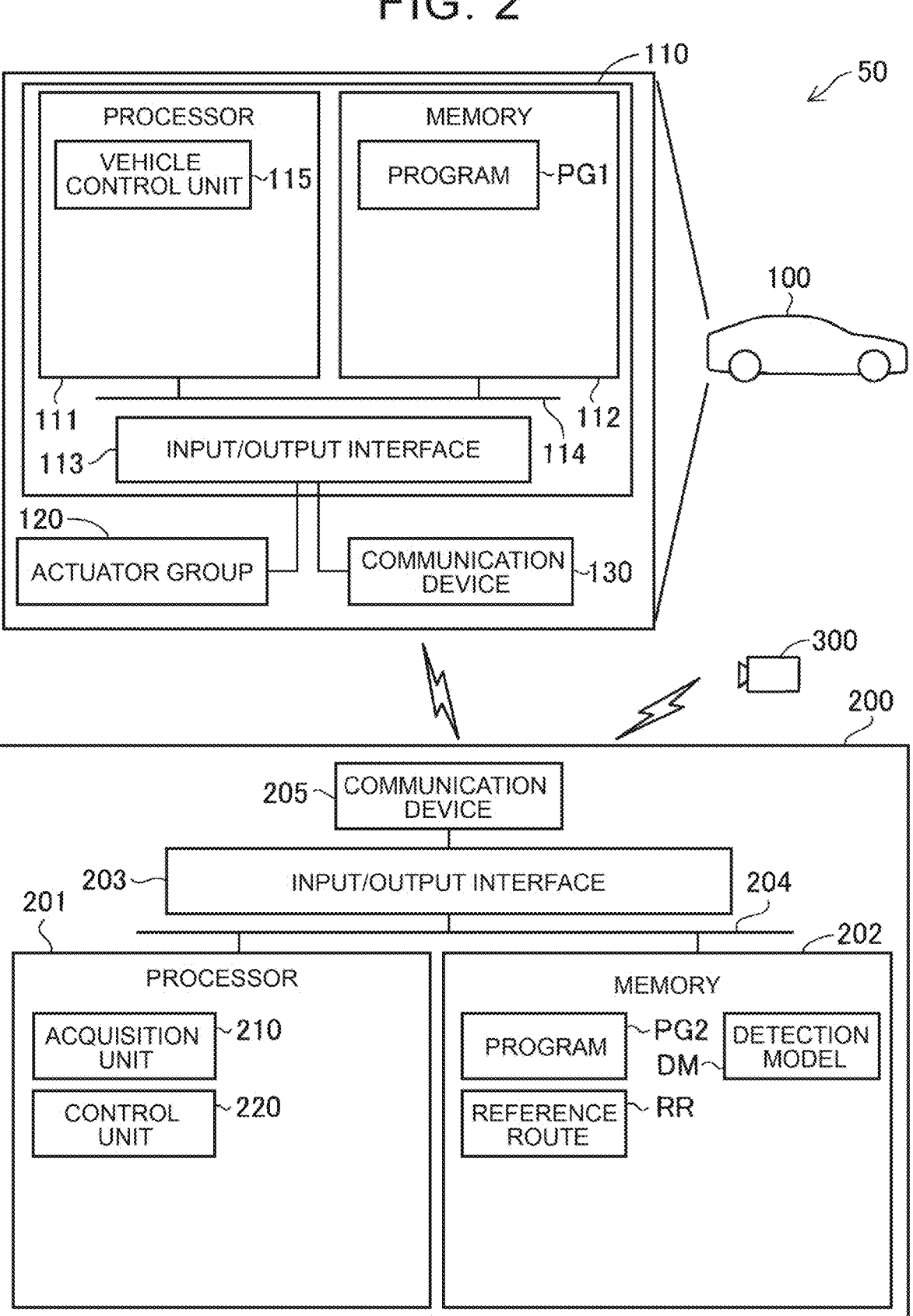
FIG. 2 is a block diagram illustrating a configuration of a system.

FIG. 2 is a block diagram illustrating a configuration of the system 50. The vehicle 100 includes a vehicle control device 110, an actuator group 120, and a communication device 130. The vehicle control device 110 is configured to control each unit of the vehicle 100. The actuator group 120 includes one or more actuators driven under the control of the vehicle control device 110. The communication device 130 is configured to communicate with an external device such as the control device 200 by wireless communication. The actuator group 120 includes an actuator of a driving device for accelerating the vehicle 100, an actuator of a steering device for changing a traveling direction of the vehicle 100, and an actuator of a braking device for decelerating the vehicle 100.

The vehicle control device 110 includes a computer including a processor 111, a memory 112, an input/output interface 113, and an internal bus 114. The processor 111, the memory 112, and the input/output interface 113 are bidirectionally communicably connected via an internal bus 114. An actuator group 120 and a communication device 130 are connected to the input/output interface 113. The processor 111 executes the program PG1 stored in the memory 112 to realize various functions including functions as the vehicle control unit 115.

The vehicle control unit 115 controls the actuator group 120 to cause the vehicle 100 to travel. The vehicle control unit 115 can cause the vehicle 100 to travel by controlling the actuator group 120 using the travel control signal received from the control device 200. The travel control signal is a control signal for causing the vehicle 100 to travel. In the present embodiment, the travel control signal includes the acceleration and the steering angle of the vehicle 100 as parameters. In other embodiments, the travel control signal may include the speed of the vehicle 100 as a parameter in place of or in addition to the acceleration of the vehicle 100.

The control device 200 is a server constituted by a computer including a processor 201, a memory 202, an input/output interface 203, and an internal bus 204. The processor 201, the memory 202, and the input/output interface 203 are bidirectionally communicably connected via an internal bus 204. A communication device 205 for communicating with various devices external to the control device 200 is connected to the input/output interface 203. The communication device 205 can communicate with the vehicle 100 by wireless communication, and can communicate with each external sensor 300 by wired communication or wireless communication. The processor 201 executes the program PG2 stored in the memory 202 to realize various functions including the functions of the acquisition unit 210 and the control unit 220.

The acquisition unit 210 acquires moving object information related to the vehicle 100. In the present embodiment, the acquisition unit 210 acquires the moving object information by using the detection result by the sensor. The moving object information includes information on the position, direction, speed of the vehicle 100, and a traveling environment in which the vehicle 100 travels. The process in which the acquisition unit 210 acquires the traveling environment is also referred to as an "acquisition process".

The control unit 220 generates a travel control signal for controlling the actuator group 120 of the vehicle 100 using the moving object information acquired by the acquisition unit 210, and transmits a travel control signal to the vehicle 100, thereby causing the vehicle 100 to travel by remote control. The control unit 220 may generate and output not only the travel control signal but also a control signal for controlling various accessories provided in the vehicle 100 and actuators for operating various kinds of equipment such as a wiper, a power window, and a lamp. That is, the control unit 220 may operate the various types of equipment and the various accessories by remote control.

More specifically, the control unit 220 generates a travel control signal that is used to control the moving body so as to increase or decrease the time for traveling in the travel environment in accordance with the degree of influence of the travel environment on the quality of the vehicle 100. This step is also referred to as a "control step". The control unit 220 controls, for example, at least one of a stop time of the moving body, a moving speed of the moving body in the traveling environment, and a moving route of the moving body in order to increase or decrease a time for traveling in the traveling environment. In the present disclosure, the quality of the vehicle 100 is a concept including a function and an appearance of traveling of the vehicle 100. Hereinafter, the degree of influence of the traveling environment on the quality of the vehicle 100 is also referred to as "degree of influence". The degree of influence determined by the driving environment is determined as follows, for example.

First Driving Environment 1 driving environment including at least one of precipitation, fog, mist and lightning: degree of influence of 5 or more Second Driving Environment 2 driving environment in which the wind speed is equal to or higher than the threshold wind speed in an outdoor environment: an influence degree of 5 or more Third Driving Environment In an outdoor environment, a 3 driving environment in which there is a high possibility that leaves and nuts fall down: an influence degree of 5 or more Fourth Driving Environment The 4 driving environment in which the dust is equal to or larger than the threshold amount: an influence degree of 5 or more Fifth Driving Environment 5 driving environment in which the ultraviolet intensity is equal to or higher than the threshold intensity: degree of influence 3 or more Sixth Driving Environment A 6 traveling environment in which a traveling road surface is a bad road having a rut or an unevenness: an influence degree of 5 or more Seventh Driving Environment A 7 driving environment which is an indoor environment and does not apply to any of the 1 to 6 driving environments: degree of influence 1

In the above-described first traveling environment, the greater the precipitation amount, the density of fog and mist, and the number of lightning lights per unit time, the greater the degree of influence.

The wind speed in the second traveling environment is an average wind speed for a predetermined period, and the threshold wind speed is, for example, 10 m per second. The higher the wind speed, the higher the influence degree is determined.

In the third traveling environment, the higher the possibility that the leaves and the nuts fall down, the higher the degree of influence is determined.

The thresholds in the fourth driving environment are, for example, 2 mg/m$^3$. The greater the amount of dust, the greater the degree of influence.

The threshold-strength in the fifth driving environment is, for example, 1.5 mW/cm$^2$. The greater the ultraviolet intensity, the greater the degree of influence.

In the sixth traveling environment, the greater the degree of bad road, the greater the degree of influence.

In addition, the control unit 220 controls the moving object according to the first to sixth traveling environments described above, for example, as follows.

Control Mode 1

The vehicle 100 is controlled to shorten the time that the vehicle 100 travels in a first traveling environment including at least one of precipitation, fog, haze, and lightning.

Control Mode 2

The vehicle 100 is controlled so as to shorten the time for the vehicle 100 to travel in the second traveling environment in which the wind speed is equal to or higher than the threshold wind speed in the outdoor environment.

Control Mode 3

In the outdoor environment, the vehicle 100 is controlled so as to shorten the time for the vehicle 100 to travel in the third driving environment in which the leaves are fallen.

Control Mode 4

The vehicle 100 is controlled to shorten the traveling time of the vehicle 100 in the fourth traveling environment in which the dust is equal to or larger than the threshold amount.

Control Mode 5

In the fifth traveling environment in which the ultraviolet intensity is equal to or higher than the threshold intensity, the vehicle 100 is controlled so as to shorten the speed at which the vehicle 100 travels.

Control Mode 6

In the sixth traveling environment in which the traveling road surface is a rough road having ruts or irregularities, the vehicle 100 is controlled so as to reduce the speed at which the vehicle 100 travels.

In the above-described control mode 1, the control unit 220 controls the vehicle 100 so as to shorten the time for traveling in the first traveling environment as the degree of influence increases. By controlling the control mode 1, it is possible to prevent the vehicle 100 from being dirty or rusted due to precipitation or the like. In addition, when the vehicle 100 is not a completed vehicle but is in the form of a platform described later, there is a possibility that a current caused by a lightning strike does not pass through the traveling road surface. In this case, the possibility of lightning striking the vehicle 100 can be reduced by controlling the control mode 1.

In the above-described control mode 2, the control unit 220 controls the vehicle 100 so as to shorten the time for traveling in the second traveling environment as the degree of influence increases. By controlling the control mode 2, for example, the possibility of collision with an object blown by wind can be suppressed.

In the above-described control mode 3, the control unit 220 controls the vehicle 100 so as to shorten the time for traveling in the third traveling environment as the degree of influence increases. By controlling the control mode 3, it is possible to prevent the vehicle 100 from being contaminated by fallen leaves or the like.

In the above-described control mode 4, the control unit 220 controls the vehicle 100 so as to shorten the time for traveling in the fourth traveling environment as the degree of influence increases. By controlling the control mode 4, it is possible to prevent the vehicle 100 from being contaminated by dust or the like.

In the above-described control mode 5, the control unit 220 controls the vehicle 100 so as to shorten the time for traveling in the fifth traveling environment as the degree of influence increases. By controlling the control mode 5, for example, deterioration of the resin member of the vehicle 100 exposed to direct sunlight can be suppressed.

In the above-described control mode 6, the control unit 220 controls the vehicle 100 so as to decrease the traveling speed of the vehicle 100 traveling in the sixth traveling environment as the degree of influence increases. By the control of the control mode 6, it is possible to suppress the vibration that the vehicle 100 is subjected to by traveling on a rough road. When the vehicle 100 is not a completed vehicle but is in the form of a platform to be described later, the degree of influence by the vibration is larger than that in the case of the completed vehicle, and therefore, it is preferable that the vibration received by the traveling of a bad situation can be suppressed.

For example, when the first location PL1 and the second location PL2 are in an indoor environment and the track TR is raining in an outdoor environment, the control unit 220 controls the traveling velocity of the vehicles 100 in the track TR to be faster than when the traveling velocity is not raining and is clear.

The external sensor 300 is a sensor located outside the vehicle 100. The external sensor 300 in the present embodiment is a sensor that captures the vehicle 100 from the outside of the vehicle 100. The external sensor 300 includes a communication device (not shown), and can communicate with another device such as the control device 200 by wired communication or wireless communication.

The external sensor 300 is constituted by, for example, a camera. The camera as the external sensor 300 captures a captured image including the vehicle 100, and outputs the captured image as a detection result.

FIG. 3 is a flowchart illustrating a processing procedure of travel control of the vehicle 100 according to the first embodiment. In the process of FIG. 3, the processor 201 of the control device 200 functions as the acquisition unit 210 and the control unit 220 by executing the program PG2. The processor 111 of the vehicle 100 functions as the vehicle control unit 115 by executing the program PG1.

In S110, the processor 201 of the control device 200 acquires the moving object information including the vehicle position information and the environmental information of the vehicle 100 using the detection result outputted from the external sensor 300. The vehicle position information is position information that is a basis for generating a travel control signal. In the present embodiment, the vehicle position information includes the position and orientation of the vehicle 100 in the global coordinate system GC of the factory FC. Specifically, in S110, the processor 201 acquires vehicle-position data using captured images acquired from cameras that are the external sensors 300. The environment information includes information indicating a traveling environment in which the vehicle 100 travels and the degree of influence of the traveling environment.

Specifically, in S110, for example, the processor 201 detects the outer shape of the vehicle 100 from the captured image, and calculates the coordinates of the positioning point of the vehicle 100 in the coordinate system of the captured image, that is, the local coordinate system. In S110, the processor 201 obtains the position of the vehicle 100 by, for example, converting the calculated coordinates into coordinates in the global coordinate system GC. The outline of the vehicle 100 included in the captured image can be detected by, for example, inputting the captured image into a detection model DM using artificial intelligence. The detection model DM is prepared in the system 50 or outside the system 50, for example, and stored in the memory 202 of the control device 200 in advance. The detection model DM may be, for example, a learned machine learning model learned to implement either semantic segmentation or instance segmentation. As the machine learning model, for example, a convolutional neural network (hereinafter, CNN) learned by supervised learning using a learning dataset can be used. The training data set includes, for example, a plurality of training images including the vehicle 100 and a label indicating which of the regions in the training image indicates the vehicle 100 and the regions other than the vehicle 100. When CNN is learned, the parameters of CNN are preferably updated by back propagation so as to reduce the error between the output-result and -label due to the detection model DM. The processor 201 can also obtain the orientation of the vehicle 100. The processor 201 estimates the direction of the vehicle 100 based on the direction of the movement vector of the vehicle 100 calculated from the position change of the feature point of the vehicle 100 between the frames of the captured image by using, for example, the optical flow method.

In S120, the processor 201 of the control device 200 determines the target position to which the vehicles 100 should be heading next. In the present embodiment, the target position is represented by the coordinates of X, Y, Z in the global coordinate system GC. In the memory 202 of the control device 200, reference route RR that is a route on which the vehicles 100 should travel is stored in advance. The route is represented by a node indicating a starting point, a node indicating a passing point, a node indicating a destination, and a link connecting the respective nodes. The processor 201 uses the vehicle position information and the reference route RR to determine the target position to which the vehicle 100 is to be directed next. The processor 201 determines the target position on the reference route RR ahead of the current position of the vehicles 100.

In S130, the processor 201 of the control device 200 generates a travel control signal for causing the vehicle 100 to travel toward the determined target position. The processor 201 calculates the traveling speed of the vehicle 100 from the transition of the position of the vehicle 100, and compares the calculated traveling speed with the target speed. The processor 201 generally determines the acceleration so that the vehicle 100 accelerates when the travel speed is lower than the target speed, and determines the acceleration so that the vehicle 100 decelerates when the travel speed is higher than the target speed. In addition, the processor 201 determines the steering angle and the acceleration so that the vehicle 100 does not deviate from the reference route RR when the vehicle 100 is located on the reference route RR. When the vehicle 100 is not located on the reference route RR, in other words, when the vehicle 100 deviates from the reference route RR, the processor 201 determines the steering angle and the acceleration so that the vehicle 100 returns to the reference route RR. Further, the processor 201 generates a travel control signal so as to lengthen or shorten the traveling time in the traveling environment according to the degree of influence of the traveling environment in which the vehicle 100 travels.

In S140, the processor 201 of the control device 200 transmits the generated travel control signal to the vehicles 100. The processor 201 repeats the acquisition of the position of the vehicle 100, the determination of the target position, the generation of the travel control signal, the transmission of the travel control signal, and the like at predetermined intervals.

In S150, the processor 111 of the vehicle 100 receives the travel control signal transmitted from the control device 200. In S160, the processor 111 of the vehicle 100 controls the actuator group 120 using the received travel control signal, thereby causing the vehicle 100 to travel at the acceleration and the steering angle represented by the travel control signal. The processor 111 repeatedly receives the travel control signal and controls the actuator group 120 at a predetermined cycle. According to the system 50 of the present embodiment, the vehicle 100 can be driven by remote control, and the vehicle 100 can be moved without using a conveyance facility such as a crane or a conveyor.

According to the control device 200 in the present embodiment described above, it is possible to change the length of time that the vehicle 100 travels under the traveling environment in accordance with the traveling environment. Thus, for example, it is possible to shorten the time for the vehicle 100 to travel in the rain.

B. Second Embodiment

Figure 4:
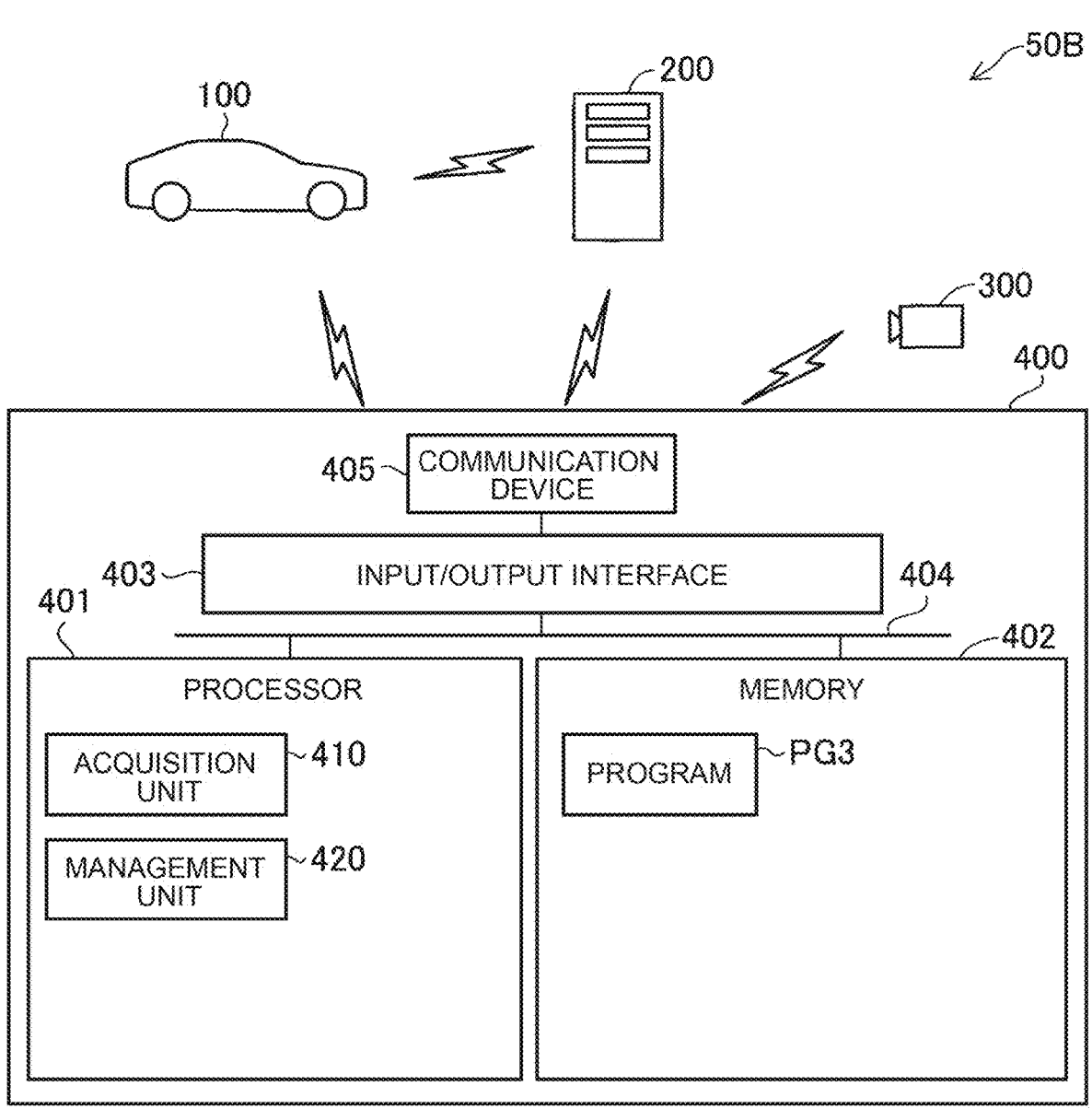
FIG. 4 is an explanatory diagram illustrating a schematic configuration of a system according to a second embodiment.

FIG. 4 is an explanatory diagram illustrating a schematic configuration of a system 50B according to the second embodiment. The present embodiment differs from the first embodiment in the system 50B includes the production management device 400. Other configurations are the same as those of the first embodiment unless otherwise described.

The production management device 400 is a server constituted by a computer including a processor 401, a memory 402, an input/output interface 403, and an internal bus 404. The processor 401, the memory 402, and the input/output interface 403 are bidirectionally communicably connected via an internal bus 404. A communication device 405 for communicating with various devices external to the production management device 400 is connected to the input/output interface 403. The communication device 405 can communicate with the vehicle 100 by wireless communication, and can communicate with the control device 200 and each external sensor 300 by wired communication or wireless communication. The processor 401 executes the program PG4 stored in the memory 402 to realize various functions including the functions of the acquisition unit 410 and the management unit 420.

The acquisition unit 410 acquires environment information that is information about a traveling environment in which the vehicle 100 travels. In the present embodiment, the acquisition unit 410 acquires the environment information by using the detection result by the sensor.

The management unit 420 adjusts the number of vehicles 100 to be produced using the environment information acquired by the acquisition unit 410. The production management device 400 performs, for example, control for reducing the traveling speed of the vehicle 100 via the control device 200 or not via the control device 200, thereby reducing the number of produced vehicles. In addition, the production management device 400 performs control of increasing or decreasing the number of workers working in the factory FC, and adjusts the number of vehicles 100 to be produced.

Figure 5:
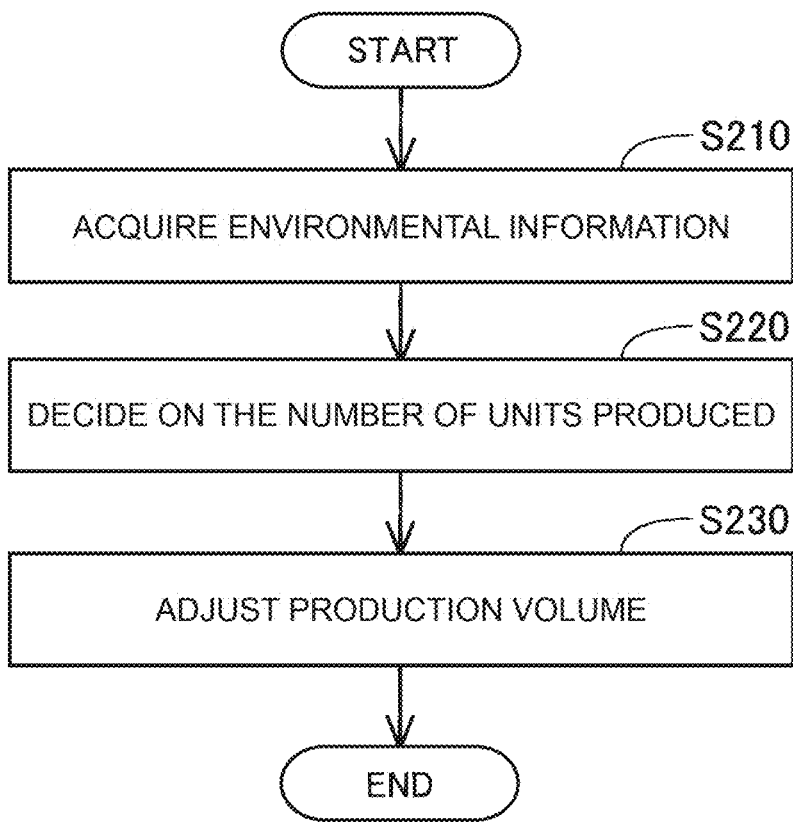
FIG. 5 is a flowchart illustrating a processing procedure of management control of the number of production units.

FIG. 5 is a flowchart illustrating a processing procedure of management control of the number of production units of the production management device 400. In the process of FIG. 5, the processor 401 of the production management device 400 functions as the acquisition unit 410 and the management unit 420 by executing the program PG3.

In S210, the processor 401 of the production management device 400 acquires environmental information using the detection result outputted from the camera as the external sensor 300. In S220, the processor 401 determines the number of vehicles 100 produced. In S230, the processor 401 adjusts the number of production units to produce the determined number of production units.

According to the production management device 400 of the second embodiment described above, the number of vehicles 100 produced can be adjusted according to the traveling environment. By adjusting the number of vehicles 100 produced, it is possible to shorten or lengthen the time for the vehicle 100 to travel in a travel environment in which the degree of influence affecting the quality of the vehicle 100 is greater than a predetermined degree.

C. Third Embodiment

Figure 6:
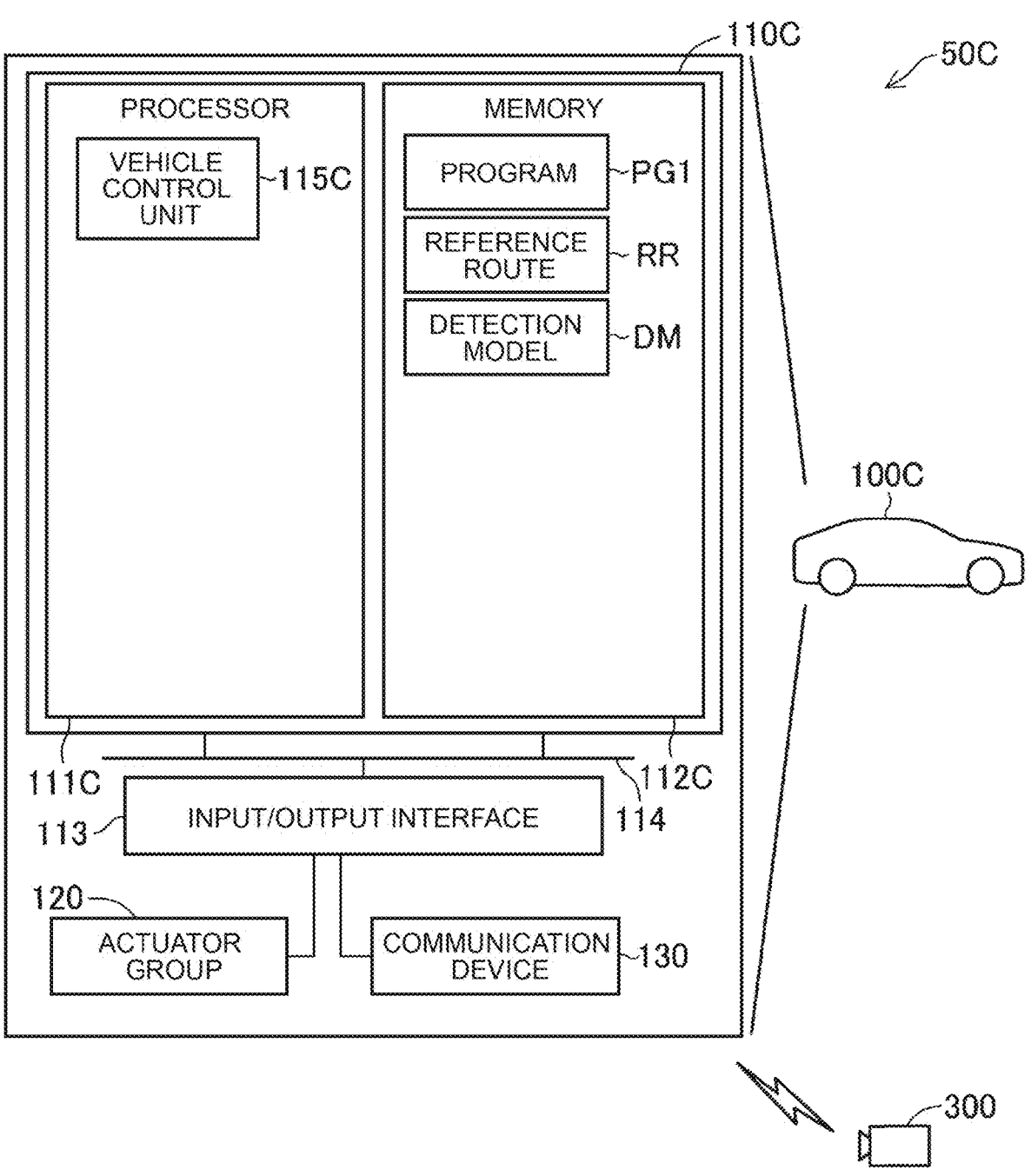
FIG. 6 is an explanatory diagram illustrating a schematic configuration of a device according to a third embodiment.

FIG. 6 is an explanatory diagram illustrating a schematic configuration of a system 50C according to a third embodiment. The present embodiment differs from the first embodiment in that the control device 200 is not provided in the system 50C. Further, the vehicle 100C according to the present embodiment can travel by autonomous control of the vehicle 100C. Other configurations are the same as those of the first embodiment unless otherwise described.

In the present embodiment, the processor 111C of the vehicle control device 110C functions as the vehicle control unit 115C by executing the program PG1 stored in the memory 112C. The vehicle control unit 115C can cause the vehicle 100C to travel by autonomous control by acquiring an output result from the sensor, generating a travel control signal using the output result, and outputting the generated travel control signal to operate the actuator group 120. In the present embodiment, in addition to the program PG1, the detection model DM and the reference route RR are stored in advance in the memory 112C.

Figure 7:
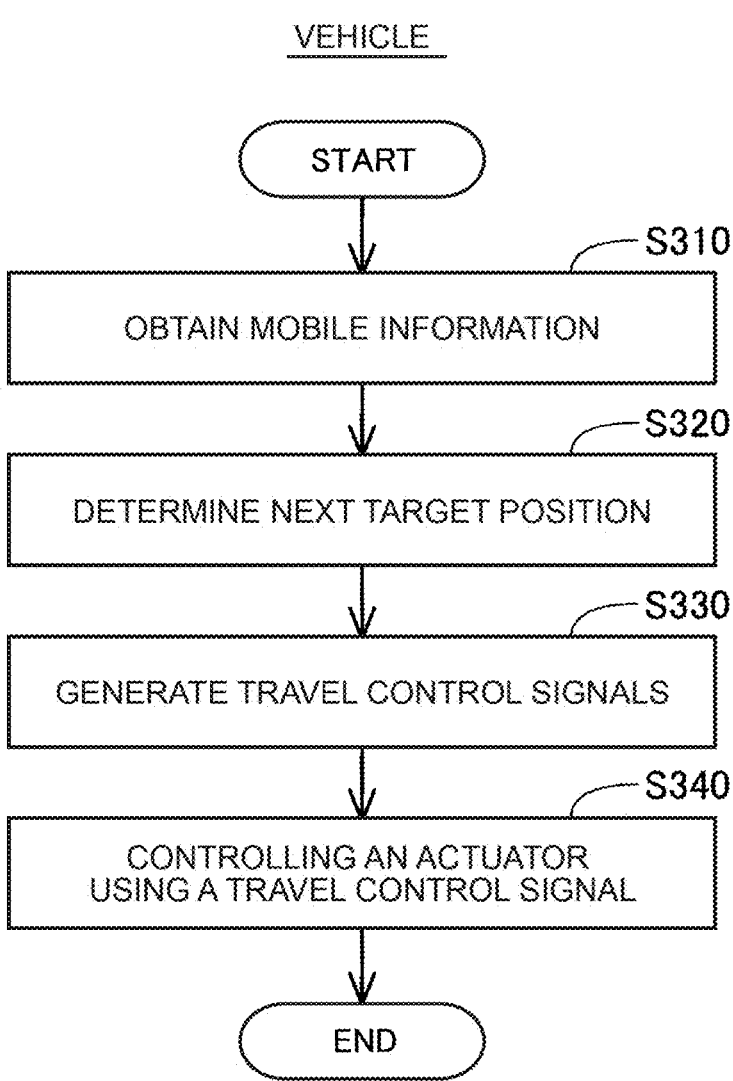
FIG. 7 is a flowchart illustrating a processing procedure of travel control of the vehicle according to the third embodiment.

FIG. 7 is a flow chart showing a process sequence of travel control of the vehicular 100C according to the third embodiment. In the process of FIG. 7, the processor 111C of the vehicle 100C functions as the vehicle control unit 115C by executing the program PG1.

In S310, the processor 111C of the vehicle control device 110C acquires the moving object information including the vehicle position information and the environmental information of the vehicle 100 using the detection result outputted from the camera which is the external sensor 300. In S320, the processor 111C determines the target position to which the vehicular 100C should be headed next. In S330, the processor 111C generates a travel control signal for causing the vehicular 100C to travel toward the determined target position. In S340, the processor 111C controls the actuator group 120 by using the generated travel control signal, thereby causing the vehicle 100C to travel in accordance with the parameter represented by the travel control signal. The processor 111C repeats acquiring the vehicle position information, determining the target position, generating the travel control signal, and controlling the actuator at a predetermined cycle. According to the system 50C of the present embodiment, the vehicle 100C can be caused to travel by autonomous control of the vehicle 100C without remotely controlling the vehicle 100C by the control device 200.

D. Other Embodiments (D1) In each of the above embodiments, the external sensor 300 is a camera. On the other hand, the external sensor 300 may not be a camera, and may be, for example, a light detection and ranging (LiDAR). In this case, the detection result output by the external sensor 300 may be three-dimensional point cloud data representing the vehicle 100. In this case, the control device 200 or the vehicle 100 may acquire the vehicle position information by template matching using three-dimensional point cloud data as a detection result and reference point cloud data prepared in advance.

(D2) In the first embodiment, the control device 200 executes processing from acquisition of vehicle position information to generation of a travel control signal. On the other hand, at least a part of the processing from the acquisition of the vehicle position information to the generation of the travel control signal may be executed by the vehicle 100. For example, the following embodiments (1) to (3) may be used.

(1) The control device 200 may acquire the vehicle position information, determine a target position to which the vehicle 100 should be heading next, and generate a route from the current position of the vehicle 100 represented by the acquired vehicle position information to the target position. The control device 200 may generate a route to a target position between the current location and the destination, or may generate a route to the destination. The control device 200 may transmit the generated route to the vehicle 100. The vehicle 100 may generate a travel control signal so that the vehicle 100 travels on the route received from the control device 200, and control the actuator group 120 using the generated travel control signal.

(2) The control device 200 may acquire the vehicle position information and transmit the acquired vehicle position information to the vehicle 100. Vehicle 100 may determine a target position to which vehicle 100 should be heading next. The vehicle 100 may generate a route from the current position of the vehicle 100 to the target position represented by the received vehicle position information. The vehicle 100 may generate a travel control signal so that the vehicle 100 travels on the generated route, and control the actuator group 120 using the generated travel control signal.

(3) In the above embodiments (1) and (2), an internal sensor may be mounted on the vehicle 100, and a detection result output from the internal sensor may be used for at least one of generation of a route and generation of a travel control signal. The internal sensor is a sensor mounted on the vehicle 100. The internal sensor may include, for example, a sensor that detects a motion state of the vehicle 100, a sensor that detects an operation state of each unit of the vehicle 100, and a sensor that detects an environment around the vehicle 100. Specifically, the inner sensor may include, for example, a camera, a LiDAR, a millimeter-wave radar, an ultrasonic sensor, a GPS sensor, an accelerometer, a gyroscope, and the like. For example, in the embodiment (1), the control device 200 may acquire the detection result of the internal sensor and reflect the detection result of the internal sensor in the path when generating the path. In the aspect (1), the vehicle 100 may acquire the detection result of the internal sensor and reflect the detection result of the internal sensor in the travel control signal when generating the travel control signal. In the aspect (2), the vehicle 100 may acquire the detection result of the internal sensor and reflect the detection result of the internal sensor in the path when generating the path. In the aspect (2), the vehicle 100 may acquire the detection result of the internal sensor and reflect the detection result of the internal sensor in the travel control signal when generating the travel control signal.

(D3) In the third embodiment, an internal sensor may be mounted on the vehicle 100C, and a detection result outputted from the internal sensor may be used for at least one of generation of a route and generation of a travel control signal. For example, the vehicular 100C may acquire the detection result of the internal sensor and reflect the detection result of the internal sensor in the route when generating the route. The vehicular 100C may acquire the detection result of the internal sensor and reflect the detection result of the internal sensor in the travel control signal when generating the travel control signal.

(D4) In the third embodiment, the vehicle 100C acquires the vehicle position information using the detection result of the external sensor 300. On the other hand, an inner sensor is mounted on the vehicular 100C. The vehicle 100C may acquire the vehicle position information by using the detection result of the inside sensor. The vehicle 100C may determine a target position at which the vehicle 100C is to be directed next. The vehicle 100C may generate a route from the current position to the target position of the vehicle 100C represented in the acquired vehicle position data. The vehicle 100C may generate a travel control signal for traveling on the generated route, and control the actuator group 120 using the generated travel control signal. In this case, the vehicle 100C can travel without using the detection result of the external sensor 300 at all. The vehicle 100C may acquire the target arrival time and the traffic jam information from the outside of the vehicle 100C and reflect the target arrival time and the traffic jam information on at least one of the route and the travel control signal. In addition, all the functional configurations of the system 50B may be provided in the vehicle 100C. That is, the process implemented by the system 50B may be implemented by the vehicular 100C alone.

(D5) In the first embodiment, the control device 200 automatically generates a travel control signal to be transmitted to the vehicle 100. On the other hand, the control device 200 may generate a travel control signal to be transmitted to the vehicle 100 in accordance with an operation of an external operator located outside the vehicle 100. For example, an external operator may operate a control device including a display, a steering, an accelerator pedal, a brake pedal, and a communication device. The control device 200 may generate a travel control signal corresponding to an operation applied to the control device. The display is configured to display a captured image output from the external sensor 300. The steering, accelerator pedal, and brake pedal are configured to remotely operate the vehicle 100. The communication device is configured to communicate with the control device 200 by wired communication or wireless communication.

(D6) In each of the above-described embodiments, the vehicle 100 may have a configuration that can be moved by unmanned driving, and may be, for example, in the form of a platform having a configuration described below. Specifically, the vehicle 100 may include at least the vehicle control device 110 and the actuator group 120 in order to perform three functions of "running," "turning," and "stopping" by unmanned driving. When the vehicle 100 acquires information from the outside for unmanned driving, the vehicle 100 may further include a communication device 130. That is, the vehicle 100 that can be moved by the unmanned driving may not be equipped with at least a part of an interior component such as a driver's seat or a dashboard. The vehicle 100 that can be moved by unmanned driving may not be equipped with at least a part of an exterior component such as a bumper or a fender. The vehicle 100 that can be moved by unmanned driving may not be fitted with the body shell. In this instance, the remaining components, such as the body shell, may be mounted to the vehicle 100 until the vehicle 100 is shipped from the factory FC. The remaining components, such as the body shell, may be mounted to the vehicle 100 after the vehicle 100 is shipped from the factory FC with the remaining components, such as the body shell, not being mounted to the vehicle 100. Each of the components may be mounted from any direction, such as the upper side, lower side, front side, rear side, right side or left side of the vehicle 100, each may be mounted from the same direction, or may be mounted from a different direction. It should be noted that the position determination can also be performed for the form of the platform in the same manner as the vehicle 100 according to the first embodiment.

(D7) The vehicle 100 may be manufactured by combining a plurality of modules. The module means a unit composed of a plurality of components arranged in accordance with a part or a function of the vehicle 100. For example, the platform of the vehicle 100 may be manufactured by combining a front module, a central module, and a rear module. The front module constitutes the front of the platform. The central module constitutes the central part of the platform. The rear module constitutes the rear of the platform. The number of modules constituting the platform is not limited to three, and may be two or less or four or more. In addition to or instead of the components constituting the platform, the components constituting a part of the vehicle 100 different from the platform may be modularized. Further, the various modules may include any exterior parts such as bumpers and grills, and any interior parts such as sheets and consoles. In addition, not only the vehicle 100 but also a moving object of an arbitrary mode may be manufactured by combining a plurality of modules. Such a module may be manufactured, for example, by joining a plurality of parts by welding, a fixture, or the like, or may be manufactured by integrally molding at least a part of the parts constituting the module as one part by casting. Molding techniques for integrally molding one part, in particular a relatively large part, are also called gigacast or megacast. For example, the front module, the central module, and the rear module described above may be manufactured using gigacast.

(D8) Transporting the vehicle 100 by using the traveling of the vehicle 100 by the unmanned driving is also referred to as "self-propelled conveyance". A configuration for realizing self-propelled conveyance is also referred to as a "vehicle remote control autonomous traveling conveyance system". Further, a production method of producing the vehicle 100 by using self-propelled conveyance is also referred to as "self-propelled production". In self-propelled manufacturing, for example, at least a part of conveyance of the vehicle 100 is realized by self-propelled conveyance in a factory FC that manufactures the vehicle 100.

(D9) In each of the above-described embodiments, some or all of the functions and processes implemented in software may be implemented in hardware. In addition, some or all of the functions and processes implemented in hardware may be implemented in software. For example, various circuits such as an integrated circuit and a discrete circuit may be used as hardware for realizing various functions in the above-described embodiments.

(D10) In each of the above-described embodiments, the control unit 220 may change the mode of control for increasing or decreasing the traveling time of the vehicle 100 in the traveling environment in accordance with the degree of influence. For example, when the vehicle 100 travels in the first traveling environment, the precipitation amount may be equal to or greater than the first threshold value. In this case, the control unit 220 controls the vehicle 100 so as to increase the speed at which the vehicle 100 travels, and performs control so as to shorten the time during which the vehicle 100 travels in the first traveling environment. In addition, the precipitation amount may be equal to or larger than the second threshold value, which is a value larger than the first threshold value. In this case, the control unit 220 controls the vehicle 100 so as to stop the vehicle 100 in the indoor environment so as not to travel in the first travel environment, and performs control so as to shorten the time for the vehicle 100 to travel in the first travel environment.

(D11) In each of the above-described embodiments, the acquisition unit 210 acquires the moving object information including the information about the traveling environment by using the detection result by the sensor. The present disclosure is not limited to this, and the acquisition unit 210 may acquire information on the traveling environment from the external server or the memory 202.

The present disclosure is not limited to each of the above embodiments, and can be realized by various configurations without departing from the spirit thereof. For example, the technical features in the embodiments corresponding to the technical features in the respective embodiments described in Summary can be appropriately replaced or combined in order to solve some or all of the above-described problems. For example, the technical features in the embodiments corresponding to the technical features in the respective embodiments described in Summary can be appropriately replaced or combined in order to achieve some or all of the above-described effects. Further, when the technical features are not described as essential in the present specification, these can be deleted as appropriate.

What is claimed is:

1. A production management system comprising:
a vehicle configured to travel by autonomous driving;
a first processor configured to control the vehicle to travel from a first place to a second place, the first place and the second place being included in a factory that manufactures the vehicle;
a sensor; and
a production management device including a second processor configured to
acquire a traveling environment for the vehicle from the sensor,
determine the number of the vehicles to be produced based on a degree of influence of the traveling environment on quality of the vehicle,
send information indicating the number of the vehicles to be produced to the first processor, wherein
the first processor is configured to control a speed at which the vehicle travels from the first place to the second place based on the information.

2. The production management system according to claim 1, wherein
the traveling environment is an outdoor environment, and
the first processor is configured to control at least one of a stop period of the vehicle, a moving speed of the vehicle in the traveling environment, and a moving route of the vehicle to reduce a traveling period in the traveling environment as the degree increases.

3. The production management system according to claim 1, wherein
the degree of influence of the traveling environment including at least one of precipitation, fog, mist, and lightning on the quality is higher than the degree of influence of the traveling environment including none of the precipitation, the fog, the mist, and the lightning on the quality, and
the first processor is configured to control the vehicle to reduce a traveling period in the traveling environment including at least one of the precipitation, the fog, the mist, and the lightning.

* * * * *